UNITED STATES PATENT OFFICE.

ERNEST A. LE SUEUR, OF OTTAWA, CANADA.

PROCESS OF EXTRACTING LIQUID METHANE FROM NATURAL GAS.

SPECIFICATION forming part of Letters Patent No. 668,197, dated February 19, 1901.

Application filed July 18, 1900. Serial No. 24,043. (No specimens.)

*To all whom it may concern:*

Be it known that I, ERNEST ARTHUR LE SUEUR, a citizen of the Dominion of Canada, residing at Ottawa, in the county of Carleton, Province of Ontario, Canada, have invented a certain new and useful Improvement in Processes of Extracting Liquid Methane from Natural Gas, of which the following is a specification.

Of all commercial fuels natural gas has by far the highest value, having per thousand feet one hundred and fifty per cent. the thermal value of good coal-gas, over three hundred per cent. that of water-gas, and over six hundred per cent. that of good producer-gas. Its great value is on account of its high percentage of methane, the heating power of which alone is considerably greater even than that of natural gas. My invention provides a means whereby the latter material may be extracted in a comparatively pure form and one, moreover, which adapts the methane for convenient transportation.

I have discovered that natural gas when highly refrigerated liquefies completely at a temperature far above that at which, for instance, the nitrogen, hydrogen, and carbon monoxid contained in it would liquefy separately. This statement has to be modified to this extent, that if more than a trace of hydrogen sulfid or carbon dioxid is contained in the particular gas treated the said substances separate out in the solid form.

If instead of carrying the process to the point of complete liquefaction I stop slightly short of this point, the resulting liquid dissolves only partially such constituents as hydrogen, nitrogen, and carbon monoxid, and I may thus prepare a comparatively pure liquid methane directly. The highly-discrepant compositions of different varieties of natural gas cause its behavior at any given pressure and temperature to vary considerably.

If I resort to complete liquefaction of the natural gas, I eliminate the nitrogen, &c., later by fractional distillation. The method I prefer, (depending, however, on the particular composition of the gas under treatment,) instead of resorting to initial complete liquefaction, is to combine "fractional condensation" with fractional distillation later on. The power required for refrigeration and other purposes may in this case conveniently be obtained from the combustion of the inferior gaseous mixture rejected from the natural gas in the process of separating the methane, and the whole of the original raw material thereby be economically utilized.

My process is as follows: I take the natural gas to be treated and lower its temperature to a suitable point by any convenient and well-known means. Certain impurities, such as hydrogen sulfid and carbon dioxid, (if contained as above,) separate out in the solid form, and I carry the refrigeration to a point at which the methane liquefies in whole or in part. In liquefying it dissolves more or less completely, depending on the composition and procedure, as above, certain other constituents of the natural gas—such as hydrogen, nitrogen, and carbon monoxid or such of these as exist in the particular gas under treatment. I then subject the liquid to a certain amount of fractional distillation, whereby is expelled from solution a gaseous mixture far richer in the last-named impurities than is the liquid itself. This gaseous mixture is useful as a fuel, although much less so than is methane. Impurities appearing, as above, in the liquid product in the solid form are filtered or settled out, and the final product consists of almost pure liquid methane. For purposes of storage and transportation it will be placed in tanks covered with any suitable non-conducting material, and said tanks may either be left open, so that the liquid contents may, by boiling at atmospheric pressure, keep the temperature down to the boiling-point at the said pressure or may be made strong enough so that they may be closed and a pressure be generated in them (regulated by a safety-valve) sufficiently high to enable storage to be effected at a much higher temperature than would otherwise be possible.

The portion of my process involving fractional distillation may conveniently be effected (in cases where the liquid is to be stored or transported before use) during said storage or transportation simply as a result of the access to the containing vessels of heat from outside sources, and the dual result thereby accomplished of purifying the liquid and of furnishing the chilling effect necessary to maintain the methane proper in the liquid form.

In transporting the liquid the gas which boils off from it during said transportation may most conveniently and economically be used in the combustion-chamber of the engine which applies propulsion to the vehicles conveying said liquid.

It will be obvious that the fractional distillation referred to above may be effected by lowering the pressure on the liquid, and thereby causing boiling. For instance, the liquid may be produced to begin with under high pressure and fractional distillation induced thereafter by relief of pressure.

What I claim is—

1. The process of preparing liquid methane in a state of comparative purity which consists in chilling natural gas until partial liquefaction occurs, whereby is precipitated a liquid richer in methane than is natural gas, substantially as described.

2. The process of preparing liquid methane in a state of comparative purity which consists in chilling natural gas until liquefaction occurs and then subjecting the resulting liquid to fractional distillation, substantially as described.

3. The process of preparing liquid methane in a state of comparative purity which consists in chilling natural gas until liquefaction occurs in whole or in part, subjecting the liquid to fractional distillation and separating certain impurities from said liquid in a frozen condition, substantially as described.

4. The process of preparing liquid methane in a state of comparative purity which consists in chilling natural gas until partial liquefaction occurs, whereby is precipitated a liquid richer in methane than is the original gas, and then in subjecting the said liquid to fractional distillation, whereby the liquid is further freed from impurities, substantially as described.

In testimony whereof I affix my signature in presence of two witnesses.

ERNEST A. LE SUEUR.

Witnesses:
LEPINE HALL RICE,
MAUDE B. BAGLEY.